US012795752B2

(12) United States Patent
Li et al.

(10) Patent No.: US 12,795,752 B2
(45) Date of Patent: Nov. 10, 2026

(54) METHOD AND EQUIPMENT FOR SESSION SETUP

(71) Applicant: SAMSUNG ELECTRONICS CO., LTD., Suwon-si (KR)

(72) Inventors: Lisi Li, Beijing (CN); Lixiang Xu, Beijing (CN); Xiaoning Ma, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 18/569,163

(22) PCT Filed: Jul. 11, 2022

(86) PCT No.: PCT/KR2022/010056
§ 371 (c)(1),
(2) Date: Dec. 11, 2023

(87) PCT Pub. No.: WO2023/013908
PCT Pub. Date: Feb. 9, 2023

(65) Prior Publication Data

US 2024/0276564 A1 Aug. 15, 2024

(30) Foreign Application Priority Data

Aug. 3, 2021 (CN) ......................... 202110888157.2
Oct. 15, 2021 (CN) ......................... 202111204709.X

(51) Int. Cl.
*H04W 76/10* (2018.01)
*H04W 28/02* (2009.01)

(52) U.S. Cl.
CPC ....... *H04W 76/10* (2018.02); *H04W 28/0252* (2013.01)

(58) Field of Classification Search
CPC ..... H04W 76/10; H04W 36/08; H04W 76/15; H04W 76/00; H04W 76/18; H04W 76/19
See application file for complete search history.

(56) References Cited

U.S. PATENT DOCUMENTS

2010/0226314 A1* 9/2010 Xu ...................... H04L 65/1016 370/328
2013/0155966 A1 6/2013 Bekiares et al.
(Continued)

FOREIGN PATENT DOCUMENTS

CN 113170487 A 7/2021
WO 2020204770 A1 10/2020

OTHER PUBLICATIONS

Supplementary European Search Report dated Sep. 30, 2024, in connection with European Patent Application No. 22853287.5, 18 pages.
International Search Report and Written Opinion of the International Searching Authority dated Oct. 11, 2022, in connection with International Application No. PCT/KR2022/010056, 7 pages.
(Continued)

*Primary Examiner* — Allahyar Kasraian

(57) ABSTRACT

The disclosure relates to a 5G or 6G communication system for supporting a higher data transmission rate. The present application relates to methods and devices for session establishments. According to an aspect of the present application, there is disclosed a method performed by a second node in a wireless communication system, which includes: receiving a message for bearer establishment request from a first node; transmitting a message for bearer establishment response to the first node.

16 Claims, 11 Drawing Sheets

(56) References Cited

U.S. PATENT DOCUMENTS

| | | | | |
|---|---|---|---|---|
| 2014/0029536 | A1 | 1/2014 | Tian et al. | |
| 2014/0274080 | A1* | 9/2014 | Gilbert | H04W 28/16 455/450 |
| 2015/0009919 | A1 | 1/2015 | Song et al. | |
| 2016/0150520 | A1 | 5/2016 | Fodor et al. | |
| 2016/0374104 | A1 | 12/2016 | Watfa et al. | |
| 2017/0238349 | A1 | 8/2017 | Uchino et al. | |
| 2018/0352449 | A1 | 12/2018 | Park et al. | |
| 2019/0098692 | A1 | 3/2019 | Atarius | |
| 2021/0084529 | A1 | 3/2021 | Chiba et al. | |
| 2021/0345363 | A1 | 11/2021 | Zhang et al. | |
| 2022/0248482 | A1* | 8/2022 | Vos | H04W 76/14 |
| 2023/0239940 | A1* | 7/2023 | Luo | H04W 76/11 370/329 |
| 2023/0397233 | A1* | 12/2023 | Wu | H04W 72/30 |
| 2024/0031969 | A1* | 1/2024 | Salkintzis | H04W 60/00 |
| 2024/0147235 | A1* | 5/2024 | Velev | H04L 63/10 |
| 2024/0147524 | A1* | 5/2024 | Wu | H04W 74/08 |

OTHER PUBLICATIONS

3GPP TS 23.401 V17.0.0 (Mar. 2021), 3rd Generation Partnership Project; Technical Specification Group Services and System Aspects; General Packet Radio Service (GPRS) enhancements for Evolved Universal Terrestrial Radio Access Network (E-UTRAN) access (Release 17), Mar. 2021, 442 pages.

3GPP TS 36.413 V16.6.0 (Jul. 2021) Technical Specification; 3rd Generation Partnership Project; Technical Specification Group Radio Access Network; Evolved Universal Terrestrial Radio Access Network (E-UTRAN); S1 Application Protocol (S1AP) (Release 16); 424 pages.

3GPP TS 38.413 V16.6.0 (Jul. 2021); Technical Specification; 3rd Generation Partnership Project; Technical Specification Group Radio Access Network; NG-RAN; NG Application Protocol (NGAP) (Release 16); 473 pages.

Partial European Search Report dated Jun. 28, 2024, in connection with European Patent Application No. 22853287.5, 15 pages.

Office Action issued Jul. 6, 2026, in connection with European Patent Application No. 22853287.5, 7 pages.

* cited by examiner

METHOD AND EQUIPMENT FOR SESSION SETUP

TECHNICAL FIELD

This application relates to the technical field of wireless communication, and more particularly, to methods and devices for session establishments.

BACKGROUND ART

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system"

Wireless communication is one of the most successful innovations in modern history. Recently, a number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, a demand for wireless data services is growing rapidly. In order to meet rapid growth of mobile data services and support new applications and deployments, it is very important to improve efficiency and coverage of wireless interfaces.

5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (cMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The present invention has been made to provide at least the advantages described below. For more enhanced communication system, there is a need for methods and equipment for session setup.

Solution to Problem

According to an aspect of the present application, there is provided a method performed by a second node in a wireless communication system, which includes: receiving a message for bearer establishment request from a first node; transmitting a message for bearer establishment response to the first node.

Optionally, if the second node determines that the requested bearer fails to be established, the message for bearer establishment response includes information for indicating the backoff time.

Optionally, if the second node determines that the requested bearer fails to be established temporarily, the message for bearer establishment response includes information for indicating suspending the request.

Optionally, the information for indicating suspending the request further includes at least one of a suspension indication and a suspension time.

Optionally, if the requested bearer is used to support session and service continuity (SSC), the message for bearer establishment request includes information related to the old PDU session.

Optionally, the information related to the old PDU session includes at least one of the following:

Information for indicating SSC mode;

Information for indicating the old PDU session ID and/or the old QoS flow identification; and Time information for indicating the remaining lifetime of the old PDU session.

According to another aspect of the present application, there is provided a method performed by a first node in a wireless communication system, which includes: transmitting a message for bearer establishment request to a second node; receiving a message for bearer establishment response from the second node.

Optionally, if the second node determines that the requested bearer fails to be established, the message for bearer establishment response includes information for indicating the backoff time.

Optionally, if the second node determines that the requested bearer fails to be established temporarily, the message for bearer establishment response includes information for indicating suspending the request.

Optionally, the information for indicating suspending the request further includes at least one of a suspension indication and a suspension time.

According to another aspect of the present application, there is provided a method performed by a second node in a wireless communication system, which includes: from a first node, receiving a message for indicating that there are multiple bearers establishment requests to be transmitted at the same time; based on the message, preparing resources for establishing multiple bearers.

Optionally, the message for indicating that there are multiple bearers establishment requests to be transmitted at the same time includes at least one of the following information: quality of service (QOS) requirements of the requested bearers; the number of the requested bearers; the available time of the requested bearers; the requested capacity requirements.

Optionally, the method further comprises transmitting a response message to the first node; the response message includes information for indicating the resource preparation result and/or information related to the strategy for transmitting multiple bearers establishment requests.

Optionally, the information for indicating the resource preparation result and/or the information related to the strategy for transmitting multiple bearers establishment requests includes at least one of the following information: an indication of resource preparation success; an indication of resource preparation failure; time for transmitting the bearer establishment request and/or the number of bearer establishment requests transmitted each time.

According to another aspect of the present application, there is provided a method performed by a first node in a wireless communication system, which includes: transmitting a message for indicating that there are multiple bearer establishment requests to be transmitted at the same time to a second node; transmitting multiple messages for bearer establishment requests to the second node at the same time.

Optionally, the message for indicating that there are multiple bearers establishment requests to be transmitted at the same time includes at least one of the following information: quality of service (QOS) requirements of the requested bearers; the number of the requested bearers; the available time of the requested bearers; the capacity requirements of the requested bearers.

Optionally, the method further comprises receiving a response message from the first node; the response message includes information for indicating the resource preparation result and/or relevant information of the strategy for transmitting multiple bearers establishment requests.

Optionally, the information for indicating the resource preparation result and/or the information related to the strategy for transmitting multiple bearers establishment requests includes at least one of the following information: an indication of resource preparation success; an indication of resource preparation failure; time for transmitting the bearer establishment request and/or the number of bearer establishment requests transmitted each time.

According to another aspect of the present application, there is provided a method performed by a first node in a wireless communication system, which includes: receiving relevant information for indicating preemption limitation from a second node, and transmitting, by the first node, a message for bearer establishment request by considering the relevant information for indicating preemption limitation.

Optionally, the relevant information for indicating preemption limitation includes relevant information for indicating the number of bearer preemption processes that can be supported on the second node.

Optionally, transmitting the message for the bearer establishment request based on the relevant information for indicating the preemption limitation further comprises: deciding, by the first node, the time for transmitting the bearer establishment request and/or the number of bearer establishment request transmitted each time, by considering the relevant information for indicating the preemption limitation; transmitting a message for the bearer establishment request based on the time for transmitting the bearer establishment request and/or the number of the bearer establishment requests transmitted each time.

According to another aspect of the present application, there is provided a method performed by a second node in a wireless communication system, which includes: transmitting relevant information for indicating preemption limitation to a first node, and receiving a message for bearer establishment request from the first node.

Optionally, the relevant information for indicating preemption limitation includes relevant information for indicating the number of bearer preemption processes that can be supported on the second node.

Optionally, transmitting, by the first node, the message for the bearer establishment request, by considering the relevant information for indicating the preemption limitation further comprises: deciding, by the first node, the time for transmitting the bearer establishment request and/or the number of bearer establishment request transmitted each time, by considering the relevant information for indicating the preemption limitation; transmitting a message for the bearer establishment request based on the time for transmitting the bearer establishment request and/or the number of the bearer establishment requests transmitted each time.

According to yet another aspect of the present application, there is provided a first node in a wireless communication system, including: a transceiver, transmitting/receiving signals to/from other network entities; and a controller, controlling the overall operation of the first node, wherein the first node is configured to perform the above method performed by the first node.

According to yet another aspect of the present application, there is provided a second node in a wireless communication system, including: a transceiver, transmitting/receiving signals to/from other network entities; and a controller controlling the overall operation of the second node, wherein the second node is configured to perform the above method performed by the second node.

Advantageous Effects of Invention

Advantages, and salient feature of the invention will become apparent to those skilled in the art from the following detailed description, which, taken in conjunction with the annexed drawing, discloses exemplary embodiments of the invention. According to embodiments of the present disclosure, methods and equipment for session setup are provided.

BRIEF DESCRIPTION OF DRAWINGS

The above and additional aspects and advantages of the present application will become more apparent and readily understood, from the following description taken in conjunction with the accompanying drawings, in which.

MODE FOR THE INVENTION

Figure 1:
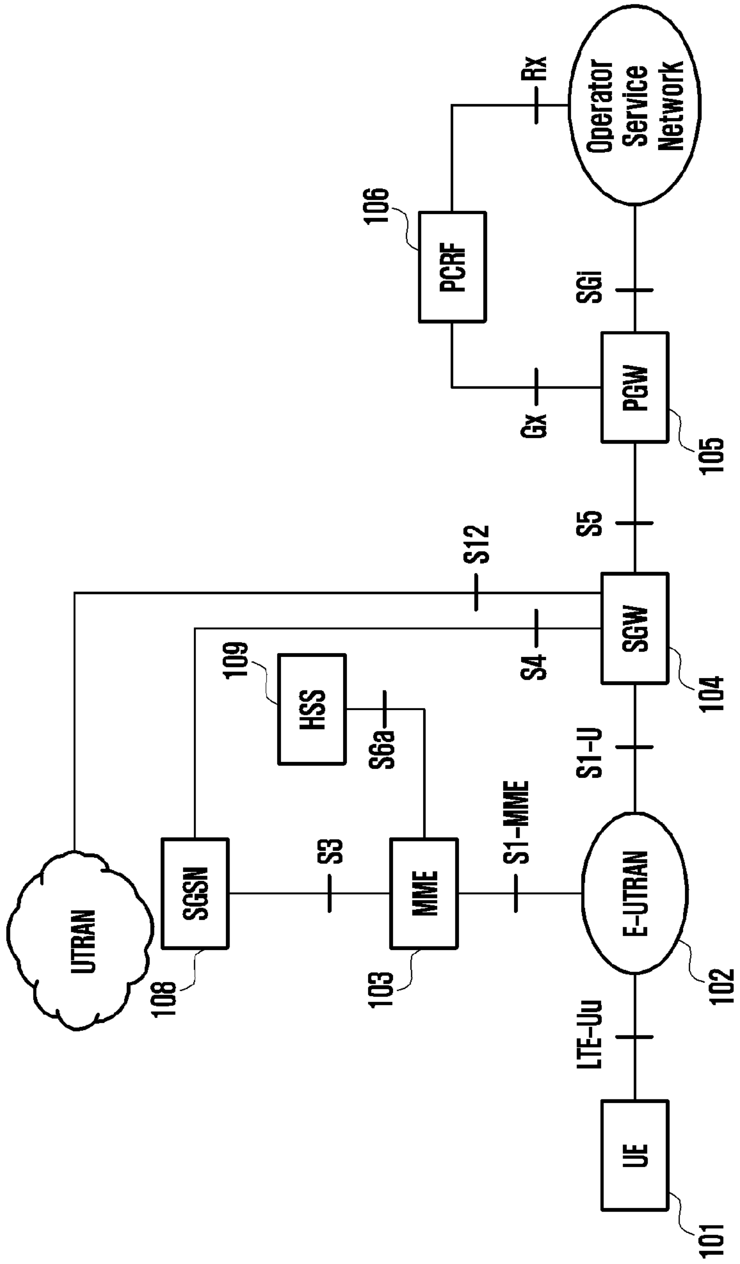
FIG. 1 is an exemplary system architecture of system architecture evolution (SAE).

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general-purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

FIGS. 1 to 8 discussed below and various embodiments used to describe the principles of the present invention in this patent document are only for illustration, and should not be interpreted as limiting the scope of the invention in any way. Those skilled in the art will understand that the principles of the present invention can be implemented in any appropriately arranged system or device.

FIG. 1 is an exemplary system architecture 100 of System Architecture Evolution (SAE). A user equipment (UE) 101 is a terminal equipment for receiving data. The evolved universal terrestrial radio access network (E-UTRAN) 102 is a radio access network, in which a macro base station (eNodeB/NodeB) that provides UE with an interface to access the radio network is included. The mobility entity (MME) 103 is responsible for managing the mobility context, session context and security information of the UE. Service gateway (SGW) 104 mainly provides the function of user plane, and MME 103 and SGW 104 may be in the same physical entity. The packet network gateway (PGW) 105 is responsible for charging, legally monitoring and other functions, or it may be in the same physical entity as the SGW 104. Policy and charging rule function entity (PCRF) 106 provides quality of service (QOS) policies and charging criteria. General packet radio service support node (SGSN) 108 is a network node equipment in universal mobile telecommunications system (UMTS) that provides a route for data transmission. Home subscriber server (HSS)109 is the home subsystem of UE, which is responsible for protecting user information including current location of UE, address of service node, user security information, packet data context of UE, etc.

Figure 2:
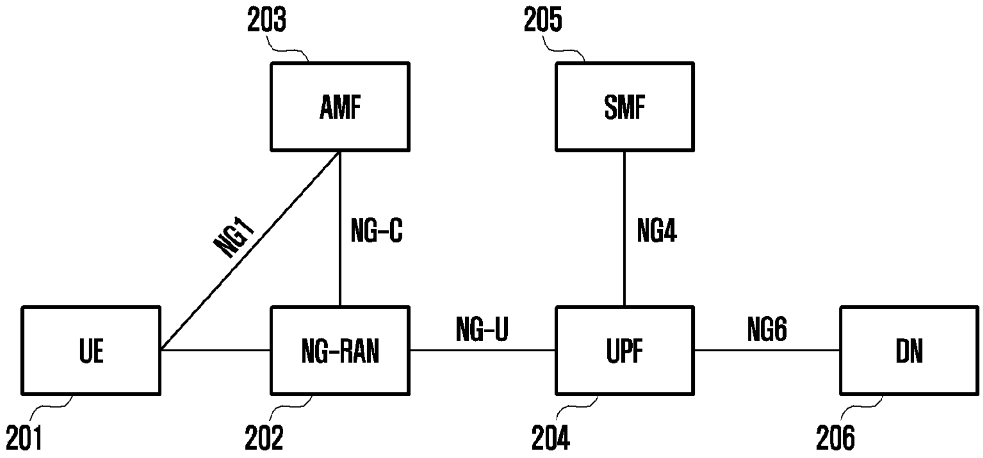
FIG. 2 is an exemplary system architecture according to various embodiments of the present invention.

FIG. 2 is an exemplary system architecture 200 according to various embodiments of the present invention. Other embodiments of the system architecture 200 can be used without departing from the scope of the present invention.

A user equipment (UE)201 is a terminal equipment for receiving data. The next generation radio access network (NG-RAN) 202 is a radio access network, in which a base station (gNB or an eNB connected to the 5GC of the 5G core network, the CNB connected to the 5GC is also called ng-gNB) that provides UE with an interface to access the radio network interface in included. The access and mobility management function entity (AMF) 203 is responsible for managing the mobility context and security information of the UE. The user plane function entity (UPF) 204 mainly provides the function of the user plane. Session management function SMF 205 is responsible for session management. The data network (DN) 206 includes services of operators, Internet access and services of third parties.

With the demand of the developing wireless technology, in the 5G architecture, the functional modules originally being on the same base station are separated. Among them, some functional modules are getting closer and closer to users, while others are grouped as pool and virtualized in order to be centralized deployment. That is, the base station can be divided into two parts, one of which is a Central Unit (referred to as CU) and the other is a Distribute Unit (referred to as DU). DU is closer to users, while CU is far away from antennas, which can support multi-antenna connection and improve network performance. One CU can be connected to multiple DUs, and the functions on the CU can be virtualized. CU and DU are connected through F1 interface, which is also called fronthaul interface or fronthaul connection. The functions of Radio Resource Control (RRC) and Packet Data Convergence Protocol (PDCP) are implemented on CU, while the function of Radio Link Control (RLC), Media Access Control (MAC) and physical layer are implemented on DU.

Mission Critical (MC) communication platform and MC service have been a key priority project of 3GPP in recent years and are expected to develop in the future by receiving more demands from different departments of mission critical communication industries around the world. Driven by the 3GPP release plan, functions related to mission critical have been carried out in stages, and each release contains a complete set of standards for equipment suppliers and operators to implement and deploy in stages according to market demand.

MC service depends on the successful establishment of one dedicated bearer with QOS required by the media. When operators actually deploy mission critical systems, they find that there will be problems in establishing dedicated bearers for group calls on base stations with high load. When the base stations have insufficient resources, the bearers corresponding to MC services can preempt the resources of other bearers; but since the base stations have the limitation of bearer preemption rate (for example, within a certain period of time, the number of the bearer preemption cannot exceed a certain number, e.g., 30 per minute), the request exceeding the limit would fail. However, for the MC server, it is unknown that the reason for the failure is due to the preemption limitation of the base station; and the MC server and the core network initiating the bearer establishment request do not have a good mechanism to avoid the occurrence of this failure or improve the success rate of bearer establishment in this case to ensure the successful establishment of the MC service.

The embodiment of the invention provides various methods to optimize the establishment of MC service under the limitation of the base station, so as to improve the success rate of establishment and ensure the smooth operation of the service.

Exemplary embodiments of the present invention are further described below with reference to the accompanying drawings.

The text and drawings are provided as examples only to help understand the present disclosure. They should not be interpreted as limiting the scope of the present disclosure in any way. Although certain embodiments and examples have been provided, based on the disclosure herein, it will be apparent to those skilled in the art that changes may be made to the illustrated embodiments and examples without departing from the scope of the present disclosure.

Figure 3A:
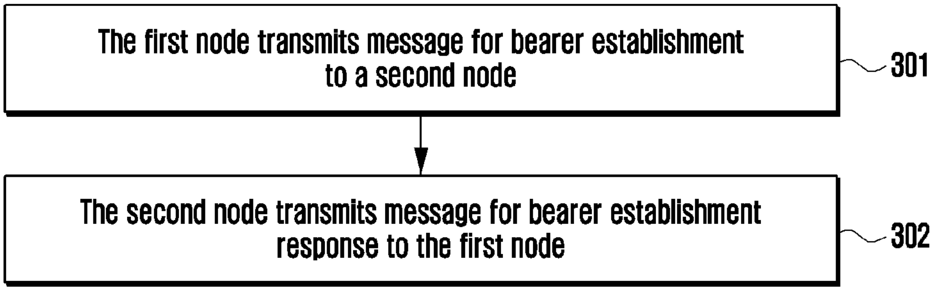
FIG. 3A illustrates a method of session establishment and control according to one exemplary embodiment of the present invention.

FIG. 3A illustrates a method of session establishment according to an exemplary embodiment of the present invention. It should be understood that the detailed description of steps unrelated to the present invention are omitted in FIG. 3A. The method of FIG. 3A includes the steps of:

At step 301, the first node transmits a message for the bearer establishment request to the second node. According to one embodiment, the requested bearer is used for MC service, for example, the bearer may be a dedicated bearer used in MC group calls. The first node is a core network node, or a Central Unit (CU) or a Central Unit-Control Plane (CU-CP) in a base station, wherein the core network node may be an access and mobility management function (AMF) or Session Management Function (SMF) or Mobility Management Entity (MME); and the second node may be a base station, or Distributed Unit (DU) or Central Unit-User Plane Central Unit-User Plane (CU-UP) in a base station. According to one embodiment, in the case that the first node is a core network node and the second node is a base station, the message for the bearer establishment request may be a PDU (Packet Data Unit or Protocol Data Unit) session resource setup request message or a PDU session resource modify request message. According to another embodiment, in the case that the first node is CU or CU-CP in the base station and the second node is DU in the base station, the message for the bearer establishment request may be a UE context setup request message or a UE context modification request message. According to another embodiment, in the case that the first node is the CU-CP in the base station and the second node is the CU-UP in the base station, the message for the bearer establishment request may be a bearer context setup request or a bearer context modification request. It should be understood that the above embodiments are only examples, and the first node, the second node and the message for the bearer establishment request are not limited thereto.

The second node receives the message for the bear establishment request.

At step 302, the second node transmits a message for the bearer establishment response to the first node.

If the second node determines that the bearer establishment requested in step 301 fails, for example, the requested bearer is used for MC service and the base station has preemption limitation, the message for bearer establishment response includes information for indicating the backoff time to inform the first node of the time to retry initiating the bearer establishment request, so as to improve the success rate of the next bearer establishment request. The first node receives the message for bearer establishment response and the information included therein, and retransmits the message for bearer establishment request to the second node in consideration of the information for indicating the backoff time. According to one embodiment, in the case that the first node is a core network node and the second node is a base station, the message for the bearer establishment response may be a PDU session resource setup response message or a PDU session resource modify response message. According to another embodiment, in the case that the first node is a CU or CU-CP in the base station and the second node is a DU in the base station, the message for the bearer establishment response may be a UE context setup failure message or a UE context setup response message or a UE context modification response message or a UE context modification failure message. According to another embodiment, in the case that the first node is the CU-CP in the base station and the second node is the CU-UP in the base station, the message for the bearer establishment response may be a bearer context setup failure message or a bearer context setup response message or a bearer context modification failure message or a bearer context modification response message. It should be understood that the above embodiments are only examples, and the first node, the second node and the message for the bearer establishment response are not limited thereto.

If the second node determines that the bearer requested in step 301 cannot be established temporarily, but considering that the request of the bearer is MC service, the second node may establish the requested bearer in the near future, then the message for the bearer establishment response includes information for indicating suspending the request, so as to inform the first node that the request in step 301 is temporarily suspended, and the second node will process the request later. After the first node receives the message for the bearer establishment response and the information included therein, it continues to wait for the response from the second node. According to one embodiment, in the case that the first node is a core network node and the second node is a base station, the message for the bearer establishment response may be a PDU session resource setup response message or a PDU session resource modify response message. According to another embodiment, in the case that the first node is a CU or CU-CP in the base station and the second node is a DU in the base station, the message for the bearer establishment response may be a UE context setup failure message or a UE context setup response message or a UE context modification response message or a UE context modification failure message. According to another embodiment, in the case that the first node is the CU-CP in the base station and the second node is the CU-UP in the base station, the message for the bearer establishment response may be a bearer context setup failure message or a bearer context setup response message or a bearer context modification failure message or a bearer context modification response message. The message for the bearer establishment response may also be a message transmitted by other second nodes to the first node to indicate suspending the request. It should be understood that the above embodiments are only examples, and the first node, the second node and the message for the bearer establishment response are not limited thereto.

In the present invention, bearer establishment can be realized by UE context establishment, PDU session establishment or evolved universal terrestrial radio access network-radio access bearer (E-RAB) establishment, while the establishment of bearer may also refer to the establishment of PDU session, QoS flow, DRB, E-RAB or logical channel, or may refer to the establishment of logical data transmission channel which may provide specific QoS for different services. In the present invention, bearer can may refer to PDU session, QoS flow, DRB or logical channel.

According to the above method proposed by the exemplary embodiment of the present application, the success rate of MC service establishment can be improved and the critical mission can be carried out smoothly and temporarily, in the case that there are multiple bearer establishment requests related to MC service at the same time, and the load of the base station is high and/or the base station has preemption limitations.

Figure 3B:
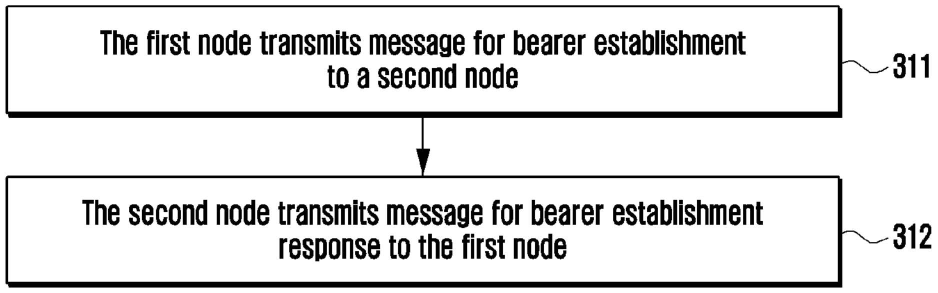
FIG. 3B illustrates a method of session establishment and control according to another exemplary embodiment of the present invention.

FIG. 3B illustrates a method of session establishment according to another exemplary embodiment of the present invention. It should be understood that the detailed description of steps unrelated to the present invention are omitted in FIG. 3B. The method of FIG. 3B includes the steps of:

At step 311: the first node transmits a message for the bearer establishment request to the second node. According to one embodiment, the requested bearer is used for MC service, for example, the bearer may be a dedicated bearer used in MC group calls. According to another embodiment, the requested bearer is used to support session and service continuity (SSC), e.g. SSC mode 3, that is, a new PDU session in where the requested bearer is will replace an old PDU session, and the new PDU session is the requested PDU session. The first node is a core network node, or CU or CU-CP in a base station, wherein the core network node may be AMF or SMF or MME, and the second node may be a base station, or DU or CU-UP in a base station. According to one embodiment, in the case that the first node is a core network node and the second node is a base station, the message for the bearer establishment request may be a PDU session resource setup request message or a PDU session resource modify request message. According to another embodiment, when the first node is CU or CU-CP in the base station and the second node is DU in the base station, the message for the bearer establishment request may be a UE context setup request message or a UE context modification request message. According to another embodiment, in the case that the first node is the CU-CP in the base station and the second node is the CU-UP in the base station, the message for the bearer establishment request may be a bearer context setup request or a bearer context modification request. According to another embodiment, in the case that the first node is the source base station in the handover procedure and the second node is the target base station in the handover procedure, the message for the bearer establishment request may be a handover request message. According to another embodiment, in the case that the first node is the last serving base station when the UE is in the INACTIVE state, and the second node is the base station that the UE newly accessed when it is from the INACTIVE state to the ACTIVE state, the message for the bearer establishment request may be a retrieve UE context response message. It should be understood that the above embodiments are only examples, and the first node, the second node and the message for the bearer establishment request are not limited thereto.

If the requested bearer is used to support SSC, the message may include information related to the old PDU session. For example, the information related to the old PDU session may be the information related to the old PDU session in SSC mode 3. In the present invention, the information related to the old PDU session may also be called the information related to the old bearer, both of which have the same meaning. In the present invention, the requested bearer may also be called the requested PDU session, both of which have the same meaning.

The second node receives the message for the bearer establishment request. When the second node performs admission control and/or rate control on the PDU session and/or QoS flow requested to be established, it considers the information related to the old PDU session. In one embodiment, the admission control performed by the second node is network slice admission control, that is, the second node ensures that the sum of Guaranteed Flow Bit Rate (GFBR) values of allowed GBR QoS flows does not exceed the UE-slice-MBR (maximum bit rate). In one embodiment, the rate control performed by the second node is network slice rate control, that is, the second node reserves and/or allocates network slice resources for GBR QOS flow successfully established. It should be understood that the above embodiments are only examples, and the types of admission control and/or rate control are not limited thereto.

If the message for the bearer establishment request includes information related to the old PDU session, the second node performs admission control in the consideration of the information. According to one embodiment, if the message for the bearer establishment request includes information related to the old PDU session, when the second node performs admission control, it performs the admission control on the Guaranteed Bit Rate (GBR) QoS flow in the requested PDU session in the consideration of the information related to the old PDU session, for example, in consideration of both the GBR QOS flow in the new PDU session and its corresponding GBR QOS flow in the old PDU session, that is, the second node can perform the admission control by halving the GFBR value of the GBR QoS flow in the new PDU session. According to another embodiment, if the message for the bearer establishment request includes information related to the old PDU session, considering that the GBR QoS flow in the new PDU session will replace the QoS flow in the old PDU session, the second node does not perform admission control on the GBR QOS flow in the new PDU session, but directly grants the new PDU session request. It should be understood that the above embodiments are only examples, and the specific implementation method of admission control in consideration of the information related to the old PDU session is not limited thereto.

If the message for the bearer establishment request includes information related to the old PDU session, the second node performs rate control on the new PDU session in consideration of the information. According to one embodiment, the second node can reserve and/or allocate resources for the GBR QOS flow in the new PDU session and its corresponding GBR QoS flow in the old PDU session according to a specific proportion, and ensure that the sum of their reserved resources is greater than or equal to GFBR, wherein the GFBR refers to the GFBR requested by one of the QoS flows, and the specific proportion, for example, may be 50% for each QoS flow, that is, 50% of the resources corresponding to GFBR are reserved for each QoS flow. It should be understood that the above embodiments are only examples, and the specific implementation method of rate control in consideration of the information related to the old PDU session is not limited thereto.

At step 312, the second node transmits a message for the bearer establishment response to the first node.

If the second node determines that the bearer establishment requested in step 301 fails, for example, the requested bearer is used for MC service and the base station has preemption limitation or the requested bearer fails to be admitted due to network slice admission control, the message for bearer establishment response includes information for indicating the backoff time to inform the first node of the time to retry initiating the bearer establishment request, so as to improve the success rate of the next bearer establishment request. The backoff time may be a value predicted or calculated by the second node. The first node receives the message for bearer establishment response and the information included therein, and retransmits the message for bearer establishment request to the second node in consideration of the information for indicating the backoff time. According to one embodiment, in the case that the first node is a core network node and the second node is a base station, the message for the bearer establishment response may be a PDU session resource setup response message or a PDU session resource modify response message. According to another embodiment, in the case that the first node is a CU or CU-CP in the base station and the second node is a DU in the base station, the message for the bearer establishment response may be a UE context setup failure message or a UE context setup response message or a UE context modification response message or a UE context modification failure message. According to another embodiment, in the case that the first node is the CU-CP in the base station and the second node is the CU-UP in the base station, the message for the bearer establishment response may be a bearer context setup failure message or a bearer establishment response message or a bearer context modification failure message or a bearer context modification response message. According to another embodiment, in the case that the first node is the source base station in the handover process and the second node is the target base station in the handover process, the message for the bearer establishment response may be handover request acknowledgement or handover failure message. It should be understood that the above embodiments are only examples, and the first node, the second node, and the message for the bearer establishment response are not limited thereto.

the second node determines that the bearer requested in step 311 cannot be established temporarily, but considering that the request of the bearer is MC service or the PDU session in where the requested bearer is will replace an old PDU session, the second node may establish the requested bearer in the near future, then the message for the bearer establishment response includes information for indicating suspending the request, so as to inform the first node that the request in step 301 is temporarily suspended, and the second node will process the request later. After the first node receives the message for the bearer establishment response and the information included therein, it continues to wait for the response from the second node. According to one embodiment, in the case that the first node is a core network node and the second node is a base station, the message for the bearer establishment response may be a PDU session resource setup response message or a PDU session resource modify response message. According to another embodiment, in the case that the first node is a CU or CU-CP in the base station and the second node is a DU in the base station, the message for the bearer establishment response may be a UE context setup failure message or a UE context setup response message or a UE context modification response message or a UE context modification failure message. According to another embodiment, in the case that the first node is the CU-CP in the base station and the second node is the CU-UP in the base station, the message for the bearer establishment response may be a bearer context setup failure message or a bearer context setup response message or a bearer context modification failure message or a bearer context modification response message. The message for the bearer establishment response may also be a message transmitted by other second nodes to the first node to indicate suspending the request. It should be understood that the above embodiments are only examples, and the first node, the second node, and the message for the bearer establishment response are not limited thereto.

In the present invention, bearer establishment can be realized by UE context establishment, PDU session establishment or evolved universal terrestrial radio access network-radio access bearer (E-RAB) establishment, while the establishment of bearer may also refer to the establishment of QoS flow, DRB or E-RAB, or may refer to the establishment of logical data transmission channel which may provide specific QoS for different services.

According to the above method proposed by the exemplary embodiment of the present application, the success rate of MC service establishment can be improved and the critical mission can be carried out smoothly and temporarily, in the case there are multiple bearer establishment requests related to MC service at the same time, and the load of the base station is high and/or the base station has preemption limitations.

According to the above method proposed by the exemplary embodiment of the present application, it may also make the node of the radio access network aware of the relationship between the newly established PDU session and the old PDU session, which may guarantee the continuity of the session and service, improve the success rate of session or bearer establishment, ensure the more effective usage of resources and improve the user experience, even when the remaining radio resources or network slice resources are insufficient or limited.

Figure 4A:
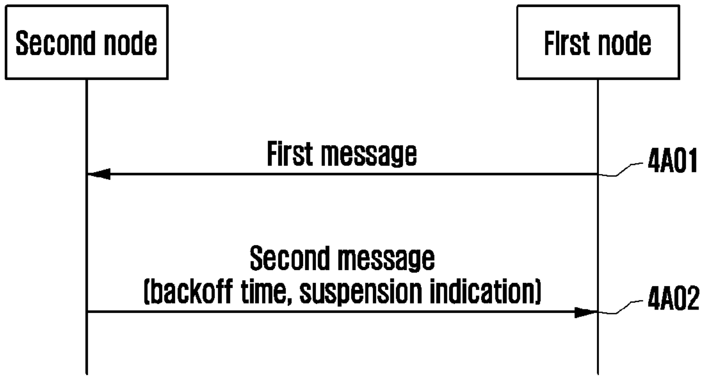
FIG. 4A illustrates a method of session establishment and control according to another exemplary embodiment of the present invention.

FIG. 4A illustrates a method of session establishment and control according to another exemplary embodiment of the present invention. It should be understood that the detailed description of steps unrelated to the present invention are omitted in FIG. 4A. The method of FIG. 4A includes the steps of:

At step 4A01, a first node transmits a first message to a second node, the first node is a core network node which may be AMF or SMF, and the second node may be a base station. The first message is a message for QoS flow establishment so as to be used in such as MC service, and may be a PDU session resource setup request message or a PDU session resource modify request message transmitted by AMF/SMF to gNB. The above are only examples, but not limitations.

The second node receives the message.

At step 4A02, the second node transmits a second message to the first node. The second message may be a PDU session resource setup response message or a PDU session resource modify response message or a message for indicating suspending the PDU session request, which may include a PDU session resource setup response transmission Information Element (IE), a PDU session resource setup failure transfer IE, and/or a PDU session resource suspension transfer IE.

For resource of each PDU session successfully established, if there is a list of QoS flows failed to be established, the PDU session resource setup response transfer IE should include the list of QoS flows failed to be established and the cause value of each QoS flow failed to be established. If the cause value is the reason related to preemption limitation, the PDU session resource setup response transfer IE should include the backoff time, which is used to inform the first node of the time when the QoS flow establishment request can be re-initiated, so as to improve the success rate of re-request.

For resource of each PDU session resource failed to be established, the PDU session resource setup failure transfer IE should include the cause value of the establishment failure. If the cause value is the reason related to preemption limitation, the PDU session resource setup failure transfer IE should include the backoff time, which is used to inform the first node of the time when the PDU session request can be reinitiated, so as to improve the success rate of re-request.

For each requested PDU session resource or QoS flow resource requested in each requested PDU session resource, if the request is suspended, the PDU session resource setup response transfer IE or PDU session resource suspension transfer IE will include information indicating that the request is suspended, which may be at least one of the following information:

Pending indication, which is used to indicate to the first node that the request for the PDU session resource or the QoS flow resource in the PDU session resource is suspended, so that the first node continues to wait for the result of the request;

Pending time, which is used to indicate to the first node that the time when the request for the PDU session resource or the QoS flow resource in the PDU session resource is suspended, so that the first node may consider re-initiating the request after the time.

According to the above method proposed by the exemplary embodiment of the present application, the success rate of MC service establishment can be improved and the critical mission can be carried out smoothly and temporarily in the case that there are multiple bearer establishment requests related to MC service at the same time, and the load of the base station is high and/or the base station has preemption limitations.

Figure 4B:
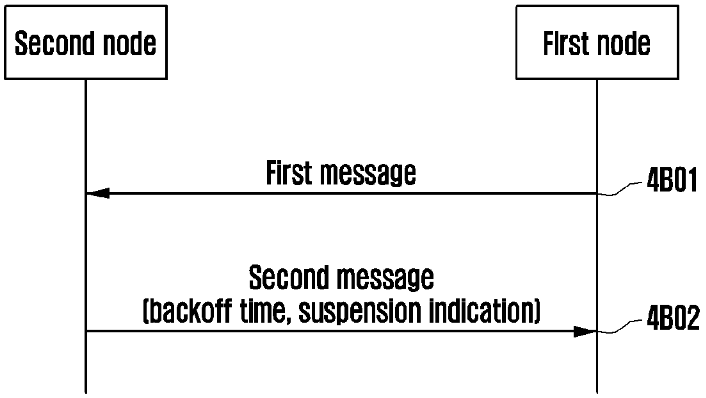
FIG. 4B illustrates a method of session establishment and control according to another exemplary embodiment of the present invention.

FIG. 4B illustrates a method of session establishment and control according to another exemplary embodiment of the present invention. It should be understood that the detailed description of steps unrelated to the present invention are omitted in FIG. 4B. The method of FIG. 4B includes the steps of:

At step 4B01, a first node transmits a first message to a second node, the first node is a core network node which may be an MME, and the second node may be a base station. The first message may be an E-RAB establishment request message or an ERAB modification request message transmitted by the MME to the eNB, and the ERAB is used for the MC service.

The second node receives the message.

At step 4B02, the second node transmits the second message to the first node.

When the first node is an MME and the second node is an eNB, the second message may be an E-RAB establishment response message or an E-RAB modification response message or a message for indicating that the E-RAB request is suspended.

The eNB shall report the results of all requested E-RABs to MME in E-RAB establishment response message or E-RAB modification response message.

If there is any E-RAB failed to be established, the list of E-RAB failed to be established should be included in E-RAB establishment failure list IE. The IE should also include the cause value of failure. If the cause value is a reason related to preemption limitation, the IE should include a backoff time, which is used to inform the first node of the time when the E-RAB establishment request can be re-initiated, so as to improve the success rate of re-request.

If there is any E-RAB request which is temporarily suspended, the E-RAB establishment failure list IE or the E-RAB establishment list IE or the E-RAB request suspension list will include information indicating that the request is suspended, which may be at least one of the following information:

Pending indication, which is used to indicate to the first node that the request for the E-RAB is suspended, so that the first node continues to wait for the result of the request;

Pending time, which is used to indicate to the first node that the time when the request for the E-RAB is suspended, so that the first node may consider re-initiating the request after the time.

According to the above method proposed by the exemplary embodiment of the present application, the success rate of MC service establishment can be improved and the critical mission can be carried out smoothly and temporarily in the case that there are multiple bearer establishment requests related to MC service at the same time, and the load of the base station is high and/or the base station has preemption limitations.

Figure 4C:
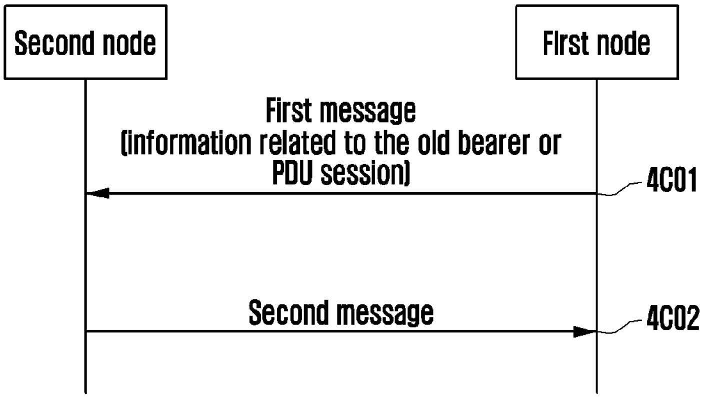
FIG. 4C illustrates a method of session establishment and control according to another exemplary embodiment of the present invention.

FIG. 4C illustrates a method of session establishment and control according to another exemplary embodiment of the present invention. It should be understood that the detailed description of steps unrelated to the present invention are omitted in FIG. 4C. The method of FIG. 4C includes the steps of:

At step 4C01, a first node transmits a first message to the second node. The first message is used to request PDU session establishment or modification. The first node is a core network node, or CU or CU-CP in a base station, wherein the core network node may be AMF or SMF or MME; and the second node may be a base station, or DU or CU-UP in a base station. According to one embodiment, in the case that the first node is a core network node and the second node is a base station, the message for the bearer establishment request may be a PDU session resource setup request message or a PDU session resource modify request message. According to another embodiment, in the case that the first node is CU or CU-CP in the base station and the second node is DU in the base station, the message for the bearer establishment request may be a UE context setup request message or a UE context modification request message. According to another embodiment, in the case that the first node is the CU-CP in the base station and the second node is the CU-UP in the base station, the message for the bearer establishment request may be a bearer context setup request or a bearer context modification request. According to another embodiment, in the case that the first node is the source base station in the handover process and the second node is the target base station in the handover process, the message for the bearer establishment request may be a handover request message. According to another embodiment, in the case that the first node is the last serving base station when the UE is in the INACTIVE state, and the second node is the base station that the UE newly accessed when it is from the INACTIVE state to the ACTIVE state, the message for the bearer establishment request may be a retrieve UE context response message. It should be understood that the above embodiments are only examples, and the first node, the second node and the first message are not limited thereto.

According to one embodiment, the requested PDU session is used to support SSC. For example, the requested PDU session may be a new PDU session in SSC mode 3, and the new PDU session corresponds to an old PDU session. After the new PDU session is established, the UE may move the service on the old PDU session to the new PDU session, and the old PDU session will be released after a period of time. The first message includes a list of PDU sessions requested to be established, and each PDU session requested to be established includes information related to the old PDU session. The second node performs admission control on the GBR QoS flow in the requested PDU session, and/or performs rate control on the successfully established QoS flow in consideration of the information related to the old PDU session. The information related to the old PDU session may include at least one of the following:

Information for indicating SSC mode (for example, indication of SSC mode 3), which is used to indicate that the requested PDU session is a PDU session for supporting SSC mode 3. When the second node performs admission control on the GBR QOS flow in the requested PDU session and/or rate control on QoS flow, it considers the information for indicating the SSC mode. In one embodiment, when the second node performs admission control, if the message for requesting PDU session includes information for indicating SSC mode, considering that the requested PDU session is about to replace the old PDU session, the second node agrees to admit the request for GBR QOS flow regardless of whether the existing load of the second node plus the GFBR value of GBR QOS flow in the requested PDU session exceeds UESlice-MBR. It should be understood that the above embodiments are only examples, and how the second node uses the information for indicating SSC mode in admission control or rate control is not limited thereto;

Information for indicating the old PDU session ID and/or the old QoS flow identification (for example, the old PDU session ID and/or the old QoS flow identification), which is used to indicate the old PDU session associated with the requested PDU session or the QoS flow in the old PDU session associated with the QoS flow in the requested PDU session, that is, the old PDU session which is about to be replaced by the requested PDU session and/or the QoS flow in the old PDU session which is about to be replaced by the QoS flow in the requested PDU session. When the second node performs admission control on the GBR QOS flow in the requested PDU session and/or rate control on the QoS flow, it considers the information for indicating the old PDU session ID and/or the old QoS flow identification. In one embodiment, when the second node performs admission control, if the message for requesting PDU session includes the information for indicating the old PDU session ID and/or the old QoS flow identification, considering that the requested PDU session is about to replace the old PDU session, the second node agrees to admit the GBR QOS flow regardless of whether the existing load of the second node plus the GFBR value of the GBR QOS flow in the requested PDU session exceeds UE-Slice-MBR. In another embodiment, when the second node performs admission control, if the message for requesting the PDU session includes information for indicating the old PDU session ID and/or the old QoS flow identification, then considering that the requested PDU session is about to replace the old PDU session, when the second node performs admission control on the GBR QOS flow in the requested PDU session, it considers whether the existing load plus a specific percentage (e.g., 50%) of the GFBR value of GBR QOS flow in the requested PDU session exceeds UE-Slice-MBR, so that after the admission is successful, the GBR QOS flow of the new PDU session can only be reserved or allocated the resources corresponding to the specific percentage of GFBR, while the resources corresponding to the remaining percentage of GFBR will be allocated to the GBR QOS flow in the old PDU session corresponding to the GBR QOS flow in the new PDU session. It should be understood that the above embodiments are only examples, and how the second node uses the information for indicating the old PDU session ID and/or the old QoS flow identification in admission control or rate control is not limited thereto.

Time information for indicating the remaining lifetime of the old PDU session (for example, the remaining lifetime value of the old PDU session), which is used to indicate the remaining lifetime value of the old PDU session associated with the requested PDU session. At the end of the lifetime, the old PDU session will be released. When the second node performs admission control on the GBR QoS flow in the requested PDU session and/or rate control on the QoS flow, it considers the remaining lifetime value of the old PDU session. In one embodiment, for example, the remaining lifetime value is less than a specific threshold, and the second node agrees to admit the GBR QOS flow regardless of whether the existing load of the second node plus the GFBR value of the GBR QOS flow in the requested PDU session exceeds UESlice-MBR. It should be understood that the above embodiments are only examples, and how the second node uses the time information of the remaining lifetime in admission control is not limited thereto.

The second node receives the first message. The second node performs admission control on the GBR QOS flow in the requested PDU session and/or rate control on the QoS flow in consideration of one or more of the above information related to the old PDU session.

In one embodiment, the above mentioned admission control performed by the second node is network slice admission control, that is, the second node ensures that the sum of GFBR values of allowed GBR QoS flows does not exceed UE-Slice-MBR (maximum bit rate). In one embodiment, for the above mentioned rate control performed by the second node, the rate control performed by the second node is network slice rate control, that is, the second node reserves and/or allocates network slice resources for GBR QoS flow successfully established. It should be understood that the above embodiments are only examples, and the types of admission control and rate control are not limited thereto.

At step 4C02, the second node transmits a second message to the first node. The second message is used to feed back the first message. The second message may include information for feeding back whether the PDU session is successfully established and/or whether the QoS flow in the PDU session is successfully established. According to one embodiment, in the case that the first node is a core network node and the second node is a base station, the second message may be a PDU session resource setup response message or a PDU session resource modify response message or a PDU session resource setup failure message or a PDU session resource modify failure message. According to another embodiment, in the case that the first node is a CU or CU-CP in the base station and the second node is a DU in the base station, the message for the bearer establishment response may be a UE context setup failure message or a UE context setup response message or a UE context modification response message or a UE context modification failure message. According to another embodiment, in the case that the first node is the CU-CP in the base station and the second node is the CU-UP in the base station, the message for the bearer establishment response may be a bearer context setup failure message or a bearer context setup response message or a bearer context modification failure message or a bearer context modification response message. According to another embodiment, in the case that the first node is the source base station in the handover process and the second node is the target base station in the handover process, the message for the bearer establishment response may be handover request acknowledgement or handover failure message. It should be understood that the above embodiments are only examples, and the first node, the second node and the second message are not limited thereto.

If, at step 4C01, the admission on QoS flow in the requested PDU session fails, there are following scenarios for the information included in the second message:

Scenario 1, for resource of each PDU session successfully established, if there is a list of QoS flows failed to be established, the second message should include the list of QOS flows failed to be established and the cause value of each QoS flow failed to be established. If the cause value is the reason related to preemption limitation or the reason related to the failure of network slice admission control in case of SSC mode 3, the second message should include the backoff time, which can be the backoff time predicted by the second node or the backoff time calculated by the second node. The backoff time may be for all QoS flows which fail, or there may be one backoff time for each QoS flow which fails to be requested. The backoff time is used to inform the first node of the time when the QoS flow establishment request can be re-initiated, so as to improve the success rate of re-request.

Scenario 2, resource of each PDU session resource failed to be established, the second message should include the cause value of the establishment failure. If the cause value is related to preemption limitation or the failure of network slice admission control in case of SSC mode 3, the second message should include the backoff time, which can be the backoff time predicted by the second node or the backoff time calculated by the second node. The fallback time may be for all QoS flows which fail, or there may be one backoff time for each QoS flow which fails to be requested The fallback time is used to inform the first node of the time when the PDU session request can be re-initiated, so as to improve the success rate of re-request.

Scenario 3, For each requested PDU session resource or QoS flow resource requested in each requested PDU session resource, if the request is temporarily suspended, the second message will include information for indicating that the request is temporarily suspended, which may be at least one of the following information:

Pending indication, which is used to indicate to the first node that the request for the PDU session resource or the QoS flow resource in the PDU session resource is suspended, so that the first node continues to wait for the result of the request;

Pending time, which is used to indicate to the first node that the time when the request for the PDU session resource or the QoS flow resource in the PDU session resource is suspended, so that the first node may consider re-initiating the request after the time.

According to the above method proposed by the exemplary embodiment of the present application, the success rate of MC service establishment can be improved and the critical mission can be carried out smoothly and temporarily in the case that there are multiple bearer establishment requests related to MC service at the same time, and the load of the base station is high and/or the base station has preemption limitations.

According to the above method proposed by the exemplary embodiment of the present application, it may also make the node of the radio access network aware of the relationship between the newly established PDU session and the old PDU session, which may guarantee the continuity of the session and service, improve the success rate of session or bearer establishment, ensure the more effective usage of resources and improve the user experience, even when the remaining radio resources or network slice resources are insufficient or limited.

Figure 5:
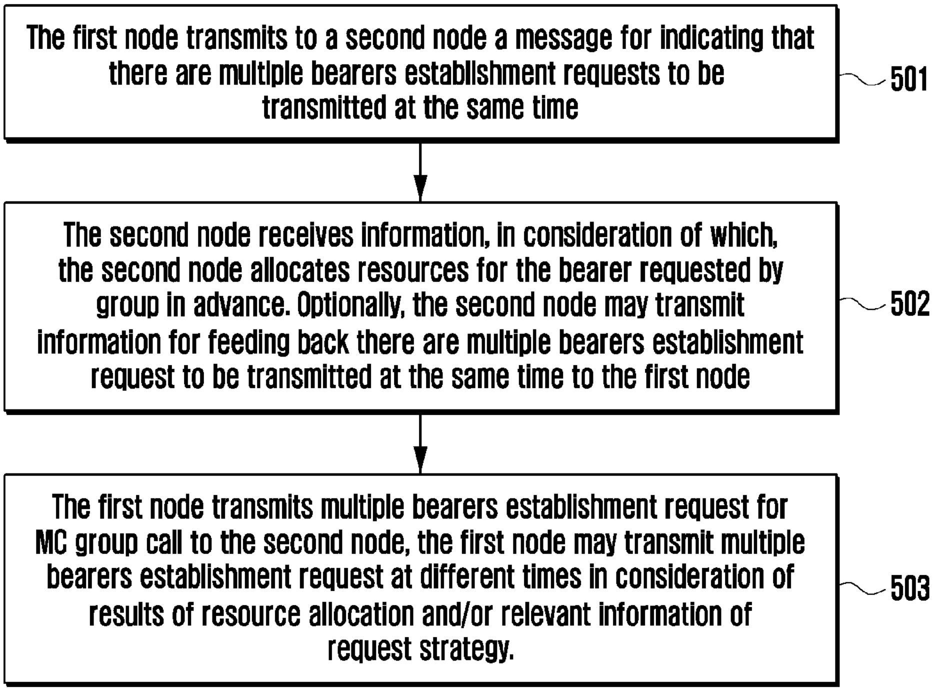
FIG. 5 illustrates a method of session establishment and control according to another exemplary embodiment of the present invention.

FIG. 5 illustrates a method of session establishment and control according to another exemplary embodiment of the present invention. It should be understood that the detailed description of steps unrelated to the present invention are omitted in FIG. 5. The method of FIG. 5 includes the steps of:

At step 501, a first node transmits a third message to a second node, the first node is a core network node, or CU or CU-CP in a base station, wherein the core network node may be AMF or SMF or MME; and the second node may be a base station, or DU or CU-UP in a base station. According to one embodiment, the core network node as the first node may transmit a third message to the base station as the second node; according to another embodiment, the CU or CU-CP in the base station as the first node may transmit a third message to the DU in the base station; as another example, the CU-CP in the base station as the first node may transmit a third message to the CU-UP in the base station as the second node. It should be understood that the above embodiments are only examples, and the first node and the second node are not limited thereto. The third message is a message indicating that there are multiple bearers establishment requests to be transmitted at the same time, which includes relevant information indicating that there are multiple bearers establishment requests to be transmitted at the same time. According to one embodiment, the third message is related to the MC service. For example, when the MC server wants to transmit a group call, it is necessary to establish multiple dedicated bearers at the same time. The above are only examples, but not limitations. The third message is transmitted before the multiple dedicated bearer establishment requests.

The relevant information for indicating that there are multiple bearers establishment requests to be transmitted at the same time may include at least one of the following information:

QOS requirement of the bearer to be requested, which is used to indicate the QoS requirement of the bearer about to be requested, so that the second node can prepare resources according to the QoS requirement;

Number of bearers to be requested, which is used to indicate the number of bearers to be requested, which refers to the number of bearers with the same QoS requirement, so that the second node can prepare resources according to the number of bearers and the corresponding QoS requirement;

Available time of the bearer to be requested, which is used to indicate the establishment time of the bearer about to be established, and if the load of the second node is too high, it is possible to reasonably preempt and allocate resources in consideration of the information;

Requested capacity requirement, which is used to indicate the capacity information required by multiple bearers about to be established, so that the second node can prepare resources in advance.

The second node receives the third message.

At step 502, the second node reserves resources for the multiple bearer establishment requests in advance in consideration the relevant information in the third message indicating that there are multiple bearer establishment requests to be transmitted at the same time; and if the available resources are not sufficient, the second node can preempt the resources of other bearers through the preemption function in advance. When the second node prepared the requested resource, the second node transmits a fourth message to the first node, wherein the fourth message is a response message of the third message and may include information indicating the result of resource preparation and/or relevant information of the strategy for transmitting multiple bearers establishment requests. The fourth message may be a mandatory message or an optional message, that is, if the fourth message is not transmitted, the first node may consider that the second node has prepared the resources to be requested next, and if the fourth message is transmitted, considering the information indicating the result of resource preparation and/or relevant information of the strategy for transmitting multiple bearers establishment requests in the fourth message, the first node may decide when and how many messages to transmit to the second node for the bearer establishment request, so as to avoid the failure of the request, thereby improving the success rate of the multiple bearers establishment at the same time.

The information for indicating the resource preparation result and/or relevant information of the strategy for transmitting multiple bearers establishment requests may include at least one of the following information:

- Indication of resource preparation success, which is used to indicate that all the requested resources are successfully prepared, so as to inform the first node that multiple bearer establishment requests can be initiated at any time;
- Indication of resource preparation failure, which is used to indicate that the requested resource is not successfully prepared, so as to inform the first node that if multiple bearer establishment request are initiated at the same time, it may fail;
- Relevant information of the strategy for transmitting multiple bearers establishment requests, which is used to indicate the first node that when the first node initiate multiple bearer establishment requests, it can transmit the multiple bearer establishment requests in consideration of relevant information of the strategy for transmitting. Relevant information of the strategy for transmitting can include: the time of transmitting the bearer establishment requests and/or the number of bearer establishment request transmitted each time, for example, how many bearer establishment requests can be transmitted at the most at the same time each time, and/or the time interval for each request, so as to ensure the success rate for each request.

At step 503, if the first node receives the information for indicating the resource preparation result and/or relevant information of the strategy for transmitting multiple bearers establishment requests transmitted in step 502, the first node transmits messages for multiple bearer establishment requests to the second node in consideration of the information.

If the first node does not receive the information transmitted in step 502, the first node may consider that the second node has prepared the resources and transmits multiple messages for bearer establishment request to the second node at the same time, and the second node uses the prepared resources to establish multiple bearers. The bearer requested to establish is the bearer information indicated in the above step 501.

In this way, the second node can prepare to resources for establishing multiple bearer in advance according to the upcoming multiple bearer establishment requests, so as to avoid the request failure caused by resource limitation, thereby improving the success rate of bearer establishment requests.

According to the above method proposed by the exemplary embodiment of the present application, the success rate of MC service establishment can be improved and the critical mission can be carried out smoothly and temporarily to ensure the safety of life and property, in the case that there are multiple bearer establishment requests related to MC service at the same time, and the load of the base station is high and/or the base station has preemption limitations.

Figure 6:
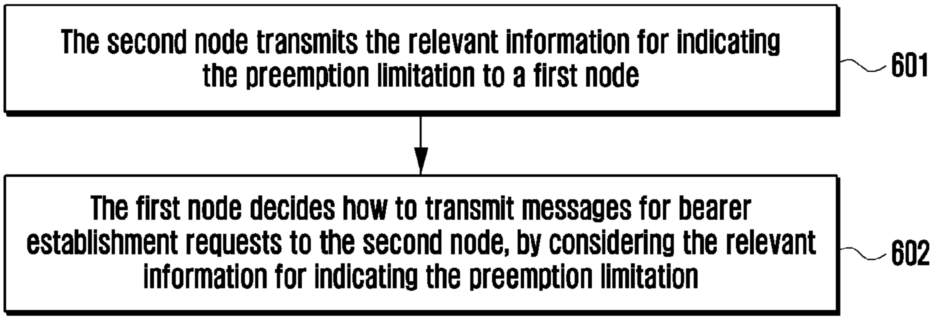
FIG. 6 illustrates a method of session establishment and control according to another exemplary embodiment of the present invention.

FIG. 6 illustrates a method of session establishment and control according to another exemplary embodiment of the present invention. It should be understood that the detailed description of steps unrelated to the present invention are omitted in FIG. 6. The method of FIG. 6 includes the steps of:

At step 601, the second node transmits the relevant information for indicating the preemption limitation to the first node, optionally the relevant information for indicating the preemption limitation is included in the message for interface setup or configuration update or the message for indicating the load status. The first node is a core network node, or CU or CU-CP in a base station, wherein the core network node may be AMF or SMF or MME, and the second node may be a base station, or DU or CU-UP in a base station. According to one embodiment, in the case that the first node is a core network node and the second node is a base station, the message for interface setup or configuration update is NG setup request or RAN configuration update or S1 setup request or eNB configuration update message. According to another embodiment, in the case that the first node is CU or CU-CP in the base station and the second node is DU in the base station, the message for interface setup or configuration update is F1 interface setup request or GNB DU configuration update message. According to another embodiment, in the case that the first node is a CU-CP in the base station and the second node is a CU-UP in the base station, the message for interface setup or configuration update is an E1 interface setup request or a GNB CU-UP configuration update message. It should be understood that the above embodiments are only examples, and the first node, the second node, and the message for interface establishment or configuration update are not limited thereto.

The message for interface setup or configuration update includes relevant information for indicating preemption limitation. The relevant information for indicating the preemption limitation includes information for indicating the number of bearer preemption processes that can be supported on the second node, for example, 30 preemptions are supported per minute, and the above are only examples, but not limitations.

At step 602, the first node receives the message and information. When a first node has multiple bearer establishment requests initiated at the same time (for example, multiple bearer establishment requests for MC services), by considering the relevant information for indicating the preemption limitation, the first node decides how to transmit multiple messages for bearer establishment requests to the second node, for example, decides the time of transmitting bearer establishment requests and/or the number of bearer establishment requests transmitted each time; and for another example, by considering the information, the first node may decide to transmit multiple messages for bearer establishment requests in groups, and decide the number of requests transmitted in each group and time interval between the times of transmitting every two groups. The above are only examples, but not limitations. By transmitting the bearer establishment request in consideration of the information, the failure of the request can be avoided, thereby improving the success rate of multiple bearer establishment requests for MC service and ensuring the MC service to be carried out smoothly.

According to the above method proposed by the exemplary embodiment of the present application, the success rate of MC service establishment can be improved and the critical mission can be carried out smoothly and temporarily, in the case that there are multiple bearer establishment requests related to MC service at the same time, and the load of the base station is high and/or the base station has preemption limitations.

Several exemplary embodiments of the present invention have been described above based on FIGS. 3 to 6, but it should be understood that the features, functions, steps, operations or any combination thereof described in any one embodiment of the present invention may be replaced by or combined with features, functions, steps, operations or any combination thereof described in other embodiments.

Figure 7:
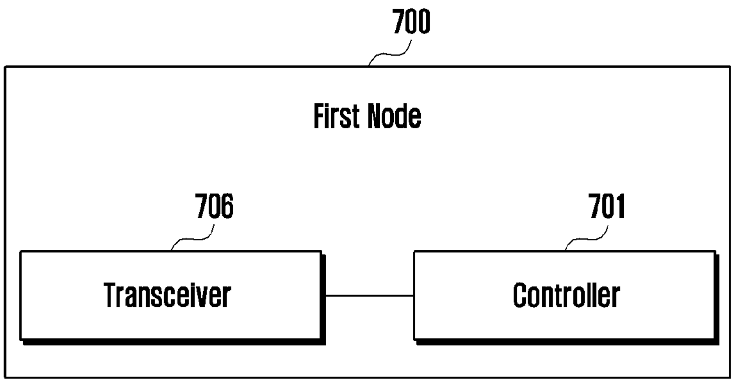
FIG. 7 illustrates a block diagram of a first node according to an exemplary embodiment of the present invention.

FIG. 7 illustrates a block diagram of a first node according to an exemplary embodiment of the present invention.

With reference to FIG. 7, the first node 700 may include a controller 701 and a transceiver 706. According to the embodiment of the present invention, the controller 701 can be defined as application specific integrated circuit or at least one processor. The controller 701 can control the overall operation of the first node and control the first node to implement various methods proposed in the present invention.

The transceiver 706 can transmit/receive signals to/from other network entities (such as but not limited to the second node) in a wired or wireless manner. For example, the transceiver 706 may transmit signals to the second node and receive signals from the second node.

It should be understood that not all components shown are necessary. The first node 700 may be implemented by more or fewer components than those shown in FIG. 7. According to one embodiment, the controller 701 and the transceiver 706 can be implemented as a single chip. According to another embodiment, the controller 701 and the transceiver 706 may be respectively implemented as separate chips.

The first node may be a core network node, or CU or CU-CP in a base station, wherein the core network node may be AMF or SMF or MME.

Figure 8:
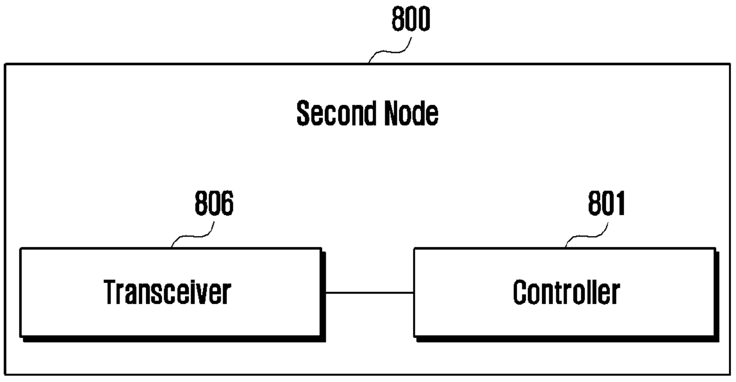
FIG. 8 illustrates a block diagram of a second node according to an exemplary embodiment of the present invention.

FIG. 8 illustrates a block diagram of a second node according to an exemplary embodiment of the present invention.

With reference to FIG. 8, the second node 800 may include a controller 801 and a transceiver 806. According to the embodiment of the present invention, the controller 801 can be defined as application specific integrated circuit or at least one processor. The controller 801 can control the overall operation of the second node and control the second node to implement various methods proposed in the present invention.

The transceiver 806 can transmit/receive signals to/from other network entities (such as but not limited to the first node) in a wired or wireless manner. For example, the transceiver 806 may transmit signals to the first node and receive signals from the first node.

It should be understood that not all components shown are necessary. The second node 800 may be implemented by more or fewer components than those shown in FIG. 8. According to one embodiment, the controller 801 and the transceiver 806 can be implemented as a single chip. According to another embodiment, the controller 801 and the transceiver 806 can be implemented as separate chips.

The second node may be a base station, or DU or CU-UP in the base station.

Those skilled in the art will understand that the various illustrative logical blocks, modules, circuits, and steps described in this application can be implemented as hardware, software, or a combination of both. In order to clearly illustrate this interchangeability of hardware and software, various illustrative components, blocks, modules, circuits, and steps are generally described above in the form of their function sets. Whether such a feature set is implemented as hardware or software depends on the specific application and design constraints imposed on the overall system. Those skilled in the art can implement the described function set in different ways for each specific application, but such design decisions should not be construed as causing a departure from the scope of this application.

The various illustrative logic blocks, modules, and circuits described in this application can be implemented or executed by general-purpose processors, digital signal processors (DSP), application-specific integrated circuits (ASIC), field programmable gate arrays (FPGA) or other programmable logic devices, discrete gate or transistor logic, discrete hardware components, or any combination designed to perform the functions described herein. A general-purpose processor may be a microprocessor, but in the alternative embodiment, the processor may be any conventional processor, controller, microcontroller, or state machine. The processor may also be implemented as a combination of computing devices, such as a combination of a DSP and a microprocessor, multiple microprocessors, one or more microprocessors in cooperation with a DSP core, or any other such configuration.

The steps of the method or algorithm described in this application can be directly embodied in hardware, in a software module executed by a processor, or in a combination thereof. The software module may reside in RAM memory, flash memory, ROM memory, EPROM memory, EEPROM memory, registers, hard disk, removable disk, or any other form of storage medium known in the art. An exemplary storage medium is coupled to the processor such that the processor can read information from/write information to the storage medium. In the alternative embodiment, the storage medium may be integrated into the processor. The processor and the storage medium may reside in the ASIC. The ASIC may reside in the user terminal. In the alternative embodiment, the processor and the storage medium may reside as discrete components in the user terminal.

In one or more exemplary designs, the functions described may be implemented in hardware, software, firmware, or any combination thereof. If implemented in software, each function can be stored as one or more instructions or codes on a computer-readable medium or transmitted through it. Computer-readable media includes both computer storage media and communication media, the latter including any media that facilitates the transfer of a computer program from one place to another. The storage medium may be any available medium that can be accessed by a general-purpose or special-purpose computer.

The embodiments of this application are only intended for the convenience of description and to help comprehensive understanding of this application, and are not intended to limit the scope of this application. Therefore, it should be understood that, in addition to the embodiments disclosed herein, all modifications and changes or forms of modifications and changes derived from the technical idea of the present application fall within the scope of the present application.

The above are only the preferred embodiments of the present invention and are not intended to limit the present invention. Any modification, equivalent replacement, improvement, etc. made within the spirit and principle of the present invention shall be included within protection scope of the present invention.

The invention claimed is:

1. A method performed by a second node in a wireless communication system, the method comprising:

receiving, from a first node, a protocol data unit (PDU) session establishment request message including a list of a requested PDU session, wherein the requested PDU session is associated with at least one requested bearer;

as a response to the PDU session establishment request message, transmitting, to the first node, a PDU session establishment response message, wherein the at least one requested bearer is for a dedicated mission critical (MC) group call, and wherein in case that an establishment of the requested PDU session fails based on a preemption limitation, the PDU session establishment response message further includes a cause value of the failure of the establishment and a backoff time.

2. The method of claim 1, wherein in case that the establishment of the requested PDU session is suspended, the PDU session establishment response message further includes a pending indication indicating that the establishment of the requested PDU session is suspended, and a pending time.

3. The method of claim 1, wherein in case that the requested PDU session supports a session and service continuity (SSC), the PDU session establishment request message further includes first information indicating that the requested PDU session supports the SSC, second information on an old PDU session for mapping the requested PDU session to the old PDU session, and third information indicating a remaining time of the old PDU session, and wherein the second information on the old PDU session includes an identifier (ID) of the old PDU session and an old quality of service (QoS) flow ID associated with the old PDU session.

4. The method of claim 1, wherein the first node includes at least one of an access and mobility management (AMF) entity or a session management function (SMF) entity, and wherein the second node includes a base station.

5. A method performed by a first node in a wireless communication system, the method comprising:

transmitting, to a second node, a protocol data unit (PDU) session establishment request message including a list of a requested PDU session, wherein the requested PDU session is associated with at least one requested bearer;

as a response to the PDU session establishment request message, receiving, from the second node, a PDU session establishment response message, wherein the at least one requested bearer is for a dedicated mission critical (MC) group call, and wherein in case that an establishment of the requested PDU session fails based on a preemption limitation, the PDU session establishment response message further includes a cause value of the failure of the establishment and a backoff time.

6. The method of claim 5, wherein in case that the establishment of the requested PDU session is suspended, the PDU session establishment response message further includes a pending indication indicating that the establishment of the requested PDU session is suspended and a pending time.

7. The method of claim 5, wherein in case that the requested PDU session supports a session and service continuity (SSC), the PDU session establishment request message further includes first information indicating that the requested PDU session supports the SSC, second information on an old PDU session for mapping the requested PDU session to the old PDU session, and third information indicating a remaining time of the old PDU session, and wherein the second information on the old PDU session includes an identifier (ID) of the old PDU session and an old quality of service (QoS) flow ID associated with the old PDU session.

8. The method of claim 5, wherein the first node includes at least one of an access and mobility management (AMF) entity or a session management function (SMF) entity, and wherein the second node includes a base station.

9. A second node in a wireless communication system, the second node comprising:

a transceiver, and a controller coupled with the transceiver, and configured to:

receive, from a first node, a protocol data unit (PDU) session establishment request message including a list of a requested PDU session, wherein the requested PDU session is associated with at least one requested bearer, as a response to the PDU session establishment request message, transmit, to the first node, a PDU session establishment response message, wherein the at least one requested bearer is for a dedicated mission critical (MC) group call, and wherein in case that an establishment of the requested PDU session fails based on a preemption limitation, the PDU session establishment response message further includes a cause value of the failure of the establishment and a backoff time.

10. The second node of claim 9, wherein in case that the establishment of the requested PDU session is suspended, the PDU session establishment response message further includes a pending indication indicating that the establishment of the requested PDU session is suspended, and a pending time.

11. The second node of claim 9, wherein in case that the requested PDU session supports a session and service continuity (SSC), the PDU session establishment request message further includes first information indicating that the requested PDU session supports the SSC, second information on an old PDU session for mapping the requested PDU session to the old PDU session, and third information indicating a remaining time of the old PDU session, and wherein the second information on the old PDU session includes an identifier (ID) of the old PDU session and an old quality of service (QoS) flow ID associated with the old PDU session.

12. The second node of claim 9, wherein the first node includes at least one of an access and mobility management (AMF) entity or a session management function (SMF) entity, and wherein the second node includes a base station.

13. A first node in a wireless communication system, the first node comprising:

a transceiver, and a controller coupled with the transceiver, and configured to:

transmit, to a second node, a protocol data unit (PDU) session establishment request message including a list of a requested PDU session, wherein the requested PDU session is associated with at least one requested bearer, as a response to the PDU session establishment request message, receive, from the second node, a PDU session establishment response message, wherein the at least one requested bearer is for a dedicated mission critical (MC) group call, and wherein in case that an establishment of the requested PDU session fails based on a preemption limitation, the PDU session establishment response message further includes a cause value of the failure of the establishment and a backoff time.

14. The first node of claim 13, wherein in case that the establishment of the requested PDU session is suspended, the PDU session establishment response message further includes a pending indication indicating that the establishment of the requested PDU session is suspended and a pending time.

15. The first node of claim 13, wherein in case that the requested PDU session supports a session and service continuity (SSC), the PDU session establishment request message further includes first information indicating that the requested PDU session supports the SSC, second information on an old PDU session for mapping the requested PDU session to the old PDU session, and third information indicating a remaining time of the old PDU session, and wherein the second information on the old PDU session includes an identifier (ID) of the old PDU session and an old quality of service (QoS) flow ID associated with the old PDU session.

16. The first node of claim 13, wherein the first node includes at least one of an access and mobility management (AMF) entity or a session management function (SMF) entity, and wherein the second node includes a base station.

* * * * *